United States Patent
Robison

(10) Patent No.: US 10,323,783 B2
(45) Date of Patent: Jun. 18, 2019

(54) FUSION TEE OUTLET ABANDONMENT DEVICE

(71) Applicant: HONEYWELL INTERNATIONAL INC., Morris Plains, NJ (US)

(72) Inventor: David Robison, Madison, OH (US)

(73) Assignee: Honeywell International Inc., Morris Plains, NJ (US)

( * ) Notice: Subject to any disclaimer, the term of this patent is extended or adjusted under 35 U.S.C. 154(b) by 234 days.

(21) Appl. No.: 15/418,069

(22) Filed: Jan. 27, 2017

(65) Prior Publication Data

US 2018/0216773 A1    Aug. 2, 2018

(51) Int. Cl.
*F16L 55/11* (2006.01)
*F16L 41/02* (2006.01)

(52) U.S. Cl.
CPC .......... *F16L 55/1108* (2013.01); *F16L 41/021* (2013.01)

(58) Field of Classification Search
CPC ............................ F16L 55/1108; F16L 41/021
USPC .............. 138/92, 94; 220/801; 215/355, 364
See application file for complete search history.

(56) References Cited

U.S. PATENT DOCUMENTS

| | | | | |
|---|---|---|---|---|
| 3,081,900 A | * | 3/1963 | Reed | F16L 55/1108 220/288 |
| 4,029,118 A | * | 6/1977 | Merideth | F16L 41/06 137/15.13 |
| 4,344,460 A | * | 8/1982 | Galos | F16L 55/11 138/89 |
| 5,076,318 A | * | 12/1991 | Fedora | F16L 47/28 137/317 |
| 5,560,388 A | * | 10/1996 | Caldwell | F16L 41/06 137/15.15 |
| 5,577,776 A | | 11/1996 | Welch | |
| 5,896,885 A | * | 4/1999 | Svetlik | F16L 41/04 137/15.14 |
| 6,758,237 B2 | * | 7/2004 | Sichler | F16L 47/34 137/318 |
| 8,826,929 B2 | | 9/2014 | Moran et al. | |
| 2007/0238398 A1 | | 10/2007 | McGivery | |
| 2018/0306369 A1 | * | 10/2018 | Piontek | F16L 19/025 |

FOREIGN PATENT DOCUMENTS

| | | |
|---|---|---|
| EP | 2210033 B1 | 8/2013 |
| GB | 2507302 B | 11/2014 |

* cited by examiner

*Primary Examiner* — Craig M Schneider
*Assistant Examiner* — David R Deal
(74) *Attorney, Agent, or Firm* — BakerHostetler

(57) ABSTRACT

A system and method are provided for abandoning a tee assembly. The tee assembly comprises a tee member, a plug, and a retention member. The tee member is coupled to a conduit and defines a main passage and a branch passage. The main passage extends into the conduit, and the branch passage extends to the main passage. The plug is slideably disposed in the branch passage and extends at least partially into the main passage. The retention member is slideably disposed in the main passage and configured to interlock with the plug within the main passage. The plug is substantially prevented from sliding out of the branch passage when the plug is interlocked with the retention member.

16 Claims, 5 Drawing Sheets

FUSION TEE OUTLET ABANDONMENT DEVICE

TECHNICAL FIELD

The present invention relates to tapping conduits, pipes, or tube-like workpieces, and more particularly, to a system and method for abandoning a tapping tee assembly.

BACKGROUND

Piping is used in many industries within various types of pipeline networks, such as water pipelines, gas pipelines, etc. The pipeline network includes mains, which are often buried, for conveying the carried fluid (e.g. water or gas) to various locations and service lines, which interconnect a home or business with a selected pipe main. In particular, the pipe main is often an existing or previously installed main that continuously carries a fluid. Tapping tee assemblies are often used for connecting secondary conduits, such as service lines, to pipe mains, particularly when the secondary conduit is to be installed to a live main. A tapping tee assembly may incorporate a drill-like or cutting tool with a mounting collar for allowing the tee to be positioned at any desired location along the main.

When a service line is abandoned, the tapping tee assembly is closed off to prevent any fluid from flowing through the abandoned service line. The closed off tapping tee assembly and associated cap fittings can project beyond the diameter of the main, which leaves the tapping tee assembly susceptible to backhoe strikes and other types of excavation damage.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

Disclosed herein is a tee assembly used for abandoning a service line. The tee assembly has a tee chimney and a tee outlet that may be cut-off or reduced in size when the service line is abandoned.

An aspect of the present disclosure provides a tee assembly that comprises a tee member, a plug, and a retention member. The tee member is coupled to a conduit and defines a main passage and a branch passage. The main passage extends from a main opening of the tee member to an interior of the conduit. The branch passage extends from a branch opening of the tee member to the main passage. The plug is slideably disposed in the branch passage and extends at least partially into the main passage. The plug has an outer diameter that is substantially similar to an inner diameter of the branch passage such that fluid flow through the branch passage is substantially prevented. The retention member is slideably disposed in the main passage. The retention member is configured to interlock with the plug within the main passage. When the retention member is interlocked with the plug, the plug is substantially prevented from moving out of the branch passage.

Another aspect of the present disclosure provides an abandonment assembly for a tee member coupled to a conduit. The tee member defines a main passage and a branch passage. The main passage extends from an exterior surface of the tee member to an interior of the conduit, and the branch passage extends from the exterior surface of the tee member to the main passage. The abandonment assembly comprises a plug and a retention member. The plug is receivable in the branch passage and at least partially receivable in the main passage. The plug has an outer diameter that is substantially similar to an inner diameter of the branch passage such that fluid flow through the branch passage is substantially prevented. The retention member is receivable in the main passage. The retention member is configured to interlock with the plug within the main passage, such that the plug is prevented from moving out of the branch passage.

Another aspect of the present disclosure provides a method for abandoning a tee assembly. The tee assembly includes a tee member that defines a main passage and a branch passage. The main passage extends into a conduit, and the branch passage extends into the main passage. The method comprises: running a cutter through the main passage and into the conduit; installing a plug through the branch passage and into the main passage; and after running the cutter through the main passage and installing the plug, installing a retention member into the main passage to interlock with the plug, wherein the plug is prevented from moving within said branch passage when interlocked with the retention member.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DESCRIPTION OF THE INVENTION

Figure 1:
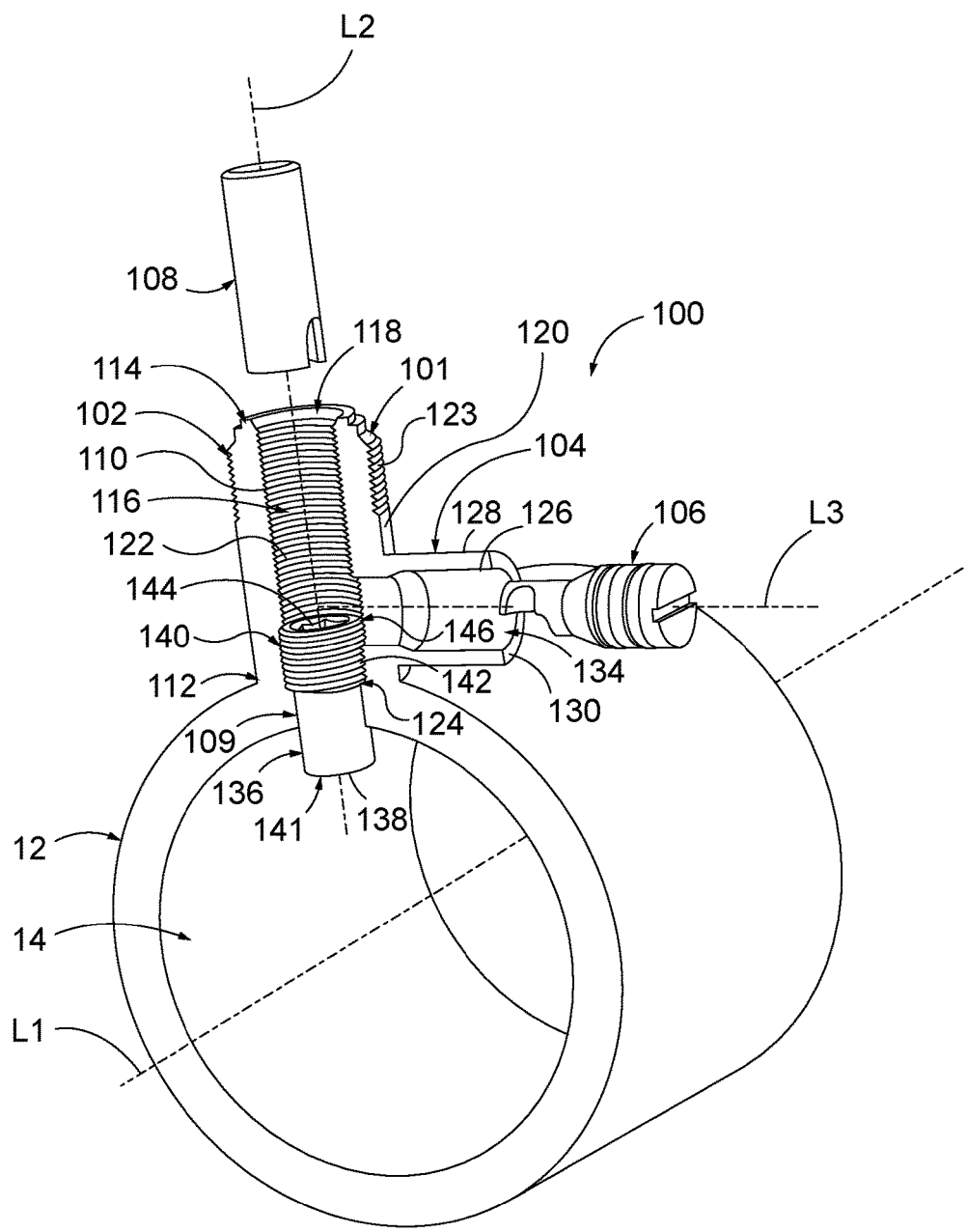
FIG. 1 illustrates an expanded view of a tee assembly in which the systems, methods, and apparatus disclosed herein may be embodied.

The figures illustrate an apparatus and method for abandoning a tapping tee assembly connected to an associated tubular or pipe-like member such as a gas main, water main, or the like. More particularly, FIG. 1 provides an expanded view of an embodiment of a tapping tee assembly 100 in which the methods, assembly, and apparatus disclosed herein may be employed. The tee assembly 100 is coupled to a main conduit 12 (e.g., a water or gas main). The tee assembly 100 may be formed as part of the main 12, or may be clamped or otherwise securely attached to the main 12. The main 12 may define a conduit channel 14 within that extends along a longitudinal axis L1. It will be appreciated that the tapping tee assembly 100 may include fewer or more components than illustrated to securely couple the assembly 100 to the main 12.

The tapping tee assembly 100 includes a tee member 101, a plug member 106, and a retention member 108. The plug member 106 and the retention member 108 together compose an abandonment assembly. The tapping tee assembly may also include a cutter 109.

The tee member 101 includes a main portion 102 (also referred to as a "chimney" or "chimney portion") and a branch portion 104. The chimney 102 may include a main inner surface 110 and a main outer surface 120 extending about the chimney 102. The chimney 102 extends along a chimney axis L2 that extends normally outward relative to the longitudinal axis L1 of the conduit channel 14. The chimney 102 may have a generally cylindrical configuration, although other configurations could be implemented. The main inner surface 110 of the chimney 102 may extend circumferentially about the chimney axis L2 from a first end 112 to a second end 114 of the chimney 102. The main inner surface 110 defines a main passage 116 that extends through the chimney 102 from the conduit channel 14 to a main opening 118 at the second end 114 of the chimney 102. The main opening 118 may open to the main outer surface 120. The main inner surface 110 includes an internal threaded portion 122 extending axially over at least a portion of an axial extent of the main passage 116. The main outer surface 120 includes an external threaded portion 123 extending axially over at least a portion of the main outer surface 120. The main inner surface 110 may also define an internal shoulder 124 for reasons described below.

The branch portion 104 may include a branch inner surface 126 and a branch outer surface 128 extending about the branch portion 104. The branch portion 104 extends along a branch axis L3 that may extend normally outward relative to the chimney axis L2 of the chimney 102. The branch portion 104 may have a generally cylindrical configuration, although other configurations could be implemented. The branch inner surface 126 may extend circumferentially about the branch axis L3 from a first branch end 125 to a second branch end 130. The branch inner surface 126 defines a branch passage 132 that extends through the branch portion 104 from the main passage 118 to a branch opening 134 at the second branch end 130. The branch opening 134 may open to the branch outer surface 128.

The branch portion 104 may be adapted for communication with a service line or other individual hookup (not shown). The branch portion 104 may be integrally formed with the chimney portion 102 so that the chimney portion 102 and the branch portion 104 can be installed onto the conduit 12 in a single structure. Alternatively, separate components can be used for the chimney portion 102 and the branch portion 104.

Figure 2:
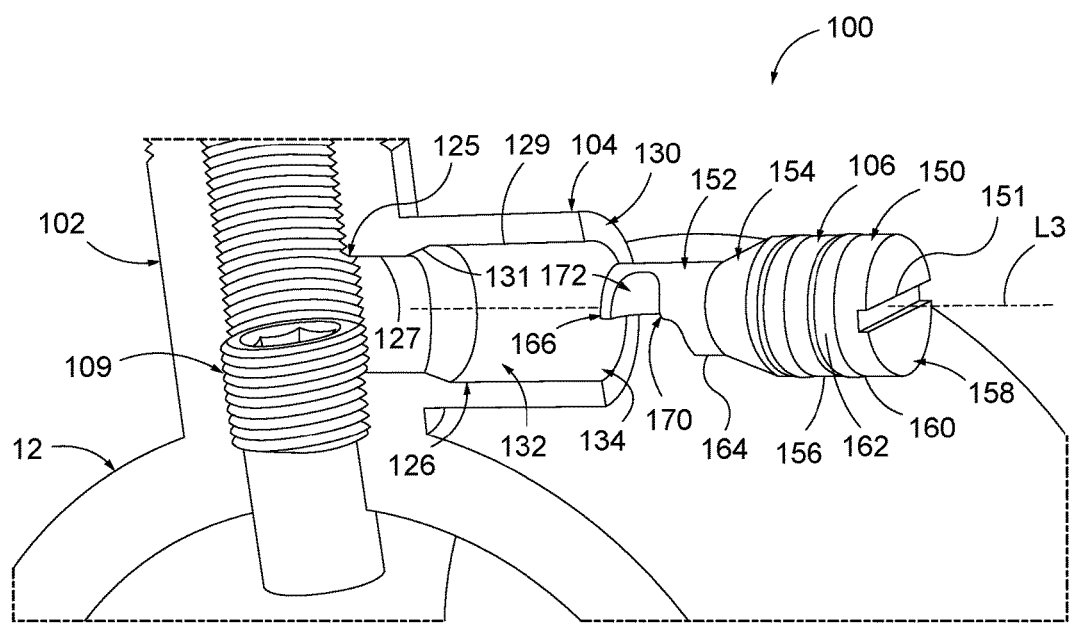
FIG. 2 illustrates an expanded view a portion of the tee assembly illustrated in FIG. 1, according to an aspect of the disclosure.

FIG. 2 illustrates an expanded view of a portion of the tee assembly 100, according to an aspect of this disclosure. The inner branch surface 126 may include a first branch surface 127, a second branch surface 129, and a branch shoulder 131 positioned between the first branch surface 127 and the second branch surface 129. The first branch surface 127, the second branch surface 129, and the branch shoulder 131 may each extend circumferentially about the branch axis L3 forming the branch passage 132. The first branch surface 127 may extend from the first branch end 125 to the branch shoulder 131. The second branch surface 129 may extend from the branch shoulder 131 to the second branch end 130. In an aspect, both the first branch surface 127 and the second branch surface may be substantially parallel to the branch axis L3 forming cylindrical portions of the branch passage 132. Alternatively, either or both of the first and second branch surfaces 127 and 129 may extend outwardly as they extend toward the second branch end 130 forming conical shapes about the branch axis L3. Unless specified otherwise, use of the word "substantially" herein is intended to mean considerable in extent or largely but not necessarily wholly that which is specified.

In an aspect, a diameter of the first branch surface 127 is substantially equivalent to a diameter of the second branch surface 129 and a diameter of the branch shoulder 131, forming a substantially cylindrical branch passage 132. Alternatively, the diameter of the first branch surface 127 may be less than a diameter of the second branch surface 129, whereby the branch shoulder 131 extends from the smaller diameter of the first branch surface 127 to the larger diameter of the second branch surface 129, forming a conical shape about the branch axis L3.

Referring to FIG. 1, the cutter 109 includes a first radial portion 136 having an annular cutting edge 138 provided at a first cutter end 141. The cutting edge 138 may be partially defined by a circumferential taper provided at the first cutter end 141. The cutting edge 138 may be configured to cut through a sidewall of the main conduit 12 for establishing fluid communication between the conduit channel 14 and the main passage 116 and branch passage 132 so that fluid in the main conduit 12 can be provided to a service line attached to the branch portion 104.

The cutter 109 further includes a second radial portion 140 a cutter threaded region 142. The cutter threaded region 142 is configured to threadedly engage with the internal threaded portion 122 of the main passage 116 for selective advancement and retraction within the main passage 116 upon rotation about the chimney axis L2. The cutter threaded region 142 may include a preselected thread pitch that cooperates with the internal threaded portion 122. Upon rotation of the cutter 109 about the chimney axis L2, the cutter 109 is either axially advanced or retracted from the chimney 102 depending on the direction of rotation. The cutter 109 may also include a recess 144, such as a hex-shaped tool socket, at a second cutter end 146 of the cutter 109 opposing the first cutter end 141. The recess 144 may be configured to receive a tool for rotating the cutter 109 about the chimney axis L2.

A passage (not visible in figures) extends axially through the cutter 109 from the first cutter end 141 to the second cutter end 146. The recess 144 is but a portion of the passage extending through the cutter 109 that is adjacent the second cutter end 146. The passage may be axially sized to receive a cutout portion or coupon created by the cutting edge 138 of the cutter 109 cutting through the sidewall of the main conduit 12. The passage may be configured to retain the coupon within.

The cutter 109 may also include other elements, including, for example, an internally threaded region, a cutter sleeve, an o-ring, a ratchet portion, or still other components or features used to facilitate cutting through the sidewall of a main conduit 12.

The tapping tee assembly 100 may also include a cap assembly 111 (See FIG. 5) configured to secure to the chimney 102. The cap assembly 111 may sealingly close the main opening 118 at the second end 114 of the chimney 102.

The cap assembly 111 may include in inner cap threaded region (not labeled) configured to engage the external threaded portion 123 of the chimney 102. Alternatively, the cap assembly 111 could be secured to the chimney 102 by other means. The cap assembly 111 may further include annular seals or o-rings to form a seal between the cap assembly 111 and the chimney 102.

Referring again to FIG. 2, the plug 106 may include an upper plug portion 150, a lower plug portion 152, and a plug shoulder 154 positioned between the upper plug portion 150 and the lower plug portion 152. The plug 106 may be constructed using a material that has a high strength, such as stainless steel, aluminum, titanium, or the like. The upper plug portion 150 may define a tool receiving element 151, such as a hex-shaped tool socket, Phillips head tool socket, flat head tool socket, or the like, configured to receive a tool for aligning the plug 106 within the branch passage 132. Alternatively, the upper plug portion 150 may include an orientation element 151a (See FIG. 4). The orientation element 151a may be used to identify the orientation of the plug 106 after it is installed within the branch passage 132. Pliers or other alignment tools may be used to rotate, move, or align the plug 106 by gripping the orientation element 151.

The upper plug portion 150 includes an upper plug surface 156 that extends from a first plug end 158 to the plug shoulder 154 along the branch axis L3. The upper plug surface 156 may define at least one groove 160 extending about the branch axis L3. The at least one axial groove 160 may be configured to receive at least one o-ring 162 within.

The lower plug portion 152 includes a lower plug surface 164 that extends from the plug shoulder 154 to the second plug end 166 along the branch axis L3. The lower plug surface 164 defines a recess 170 and a plug notch 172. The recess 170 extends along an axis that is substantially perpendicular to the branch axis L3. The plug notch 172 forms a cutout that extends along an axis that is substantially perpendicular to both the recess 170 and the branch axis L3. Alternatively, the recess 170 and the plug notch 172 may extend along axes that facilitate the coupling of the plug 106 with the retention member 108, as further described herein.

In an aspect, a diameter of the lower plug surface 164 is substantially equivalent to a diameter of the upper plug surface 156 and a diameter of the plug shoulder 154, forming a substantially cylindrical plug 106. Alternatively, the diameter of the lower plug surface 164 is less than a diameter of the upper plug surface 156, whereby the plug shoulder 154 extends from the smaller diameter of the lower plug surface 164 to the larger diameter of the upper plug surface 156, forming a conical shape about the branch axis L3.

The plug 106 may be sized to be slideably disposed within the branch passage 132 of the branch member 104. The diameter of the lower plug surface 164 may be substantially similar to the diameter of the first branch surface 127, and the diameter of the upper plug surface 156 may be substantially similar to the diameter of the second branch surface 129. The plug shoulder 154 may be configured to engage with the branch shoulder 131. For example, if the branch shoulder 131 includes a conical shape, the plug shoulder 154 may include a corresponding conical shape.

Figure 3:
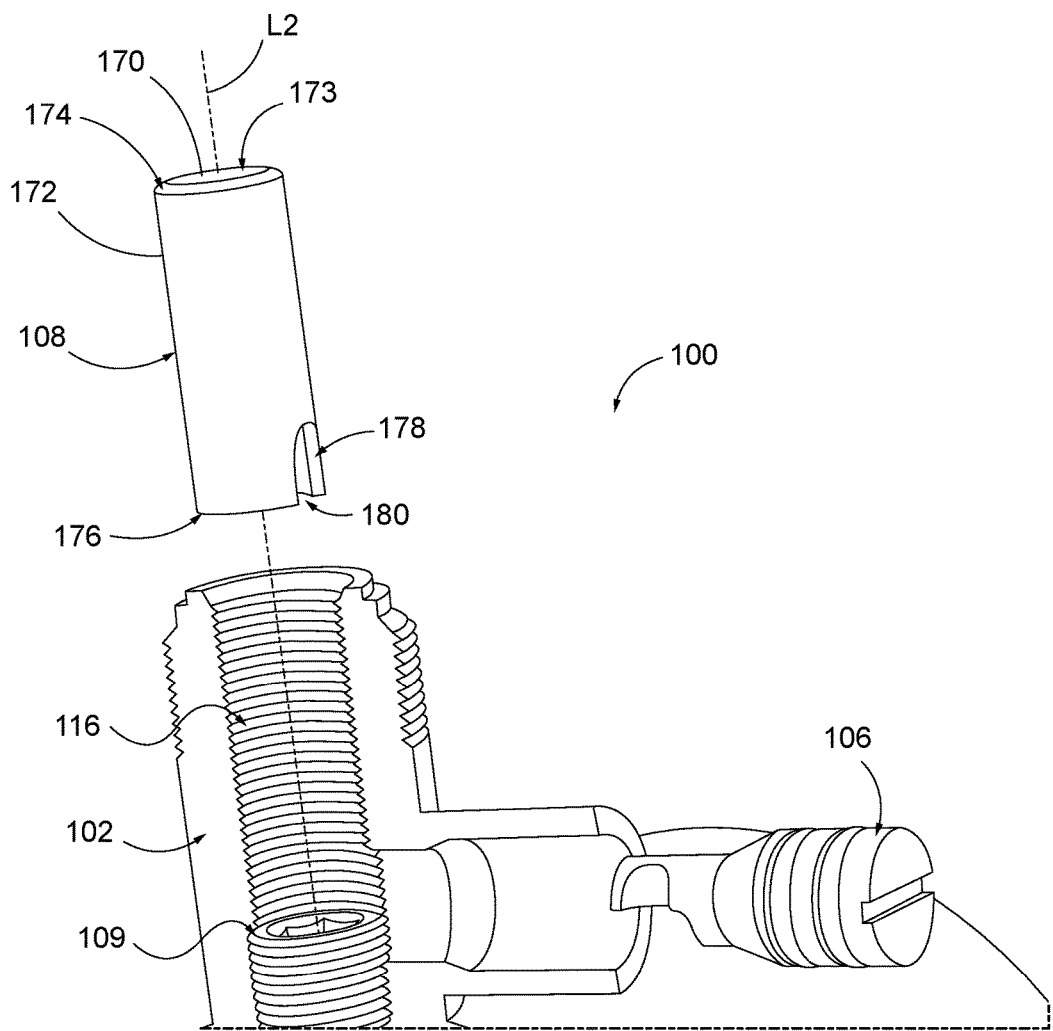
FIG. 3 illustrates an expanded view of another portion of the tee assembly illustrated in FIG. 1, according to an aspect of the disclosure.

FIG. 3 illustrates an expanded view of another portion of the tee assembly 100, according to an aspect of this disclosure. The retention member 108 includes an inner retention surface 170 and an outer retention surface 172. The inner retention surface 170 defines a retention channel 173 that extends through the retention member 108 from a first end 174 to a second end 176 of the retention member 108. The outer retention surface 172 extends from the first end 174 to the second end 176 of the retention member 108. In an aspect, the outer retention surface 172 extends parallel to the chimney axis L2 forming a cylindrical outer body. The outer retention surface 172 defines a retention notch 178 that extends from the outer retention surface 172 to the inner retention surface 170. In an aspect, the outer retention surface 172 may define a second retention notch (not visible in figures) on an opposing side of the retention member 108, thereby forming a hole that extends through the retention member 108. In another alternative aspect, the retention notch 178 opens to a notch opening 180 defined by the second end 176 of the retention member 108.

The retention member 108 may be sized to be slideably disposed within the main passage 116 of the chimney 102. The diameter of the outer retention surface 172 may be substantially similar to or slightly smaller than the main inner surface 110 of chimney 102.

The tee assembly 100 may be assembled when a service line is abandoned. Sometimes an abandoned tee member 101 may have a branch member 104 that has a length that exceeds 12 inches, which leaves the tee member 101 susceptible to excavation damage, such as backhoe strikes. To assemble the tee assembly 100, the branch member 104 may be shortened or cut down to a desired length, for example, within three inches or less of the chimney 102. This allows for no special mapping provisions to identify the tee member 101 projections and simplifies service line locating markouts.

Installing the plug 106 and the retention member 108 takes less time compared to other capping methods that would involve fusion or mechanical fittings. Abandonment of the tee assembly 100 with a shortened branch member 104 reduces the probability of future excavation damages.

Figure 4:
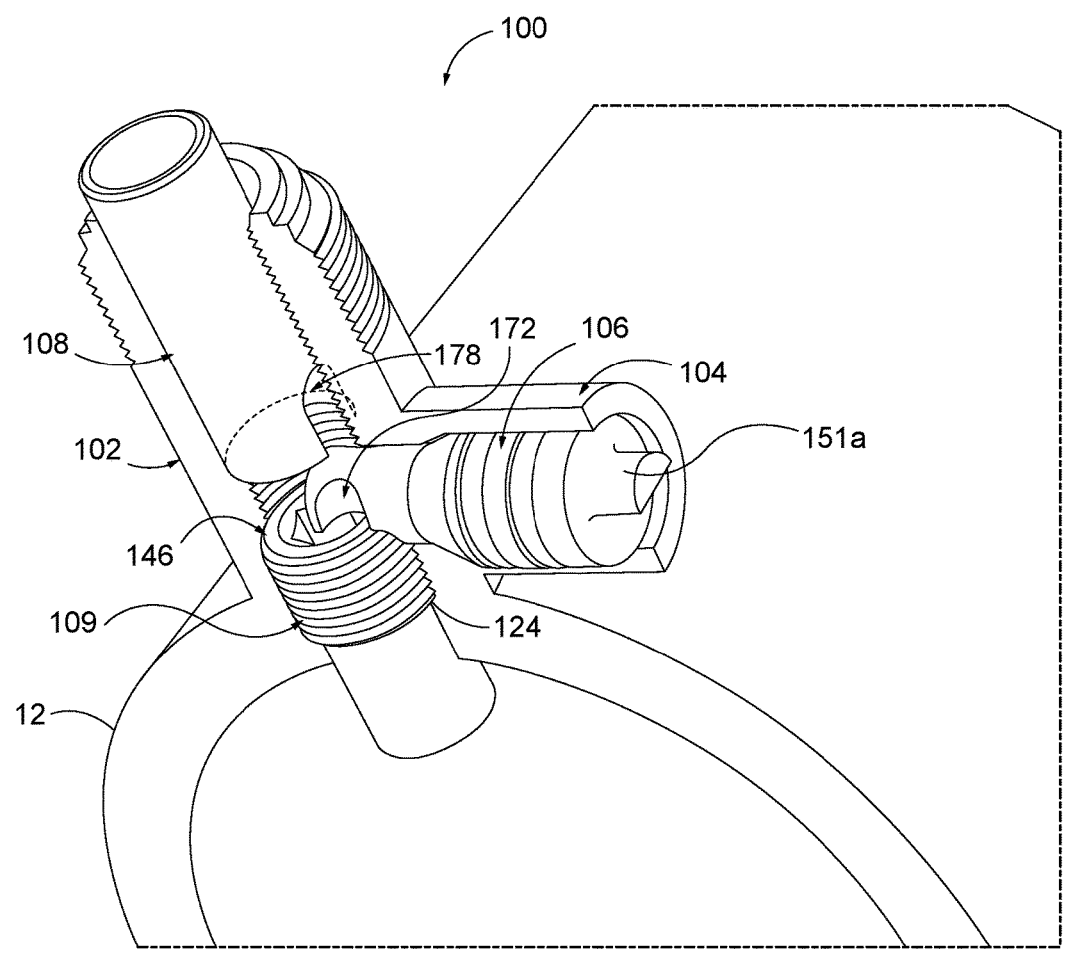
FIG. 4 illustrates a partially collapsed view of the tee assembly illustrated in FIG. 1, according to an aspect of the disclosure.
Figure 5:
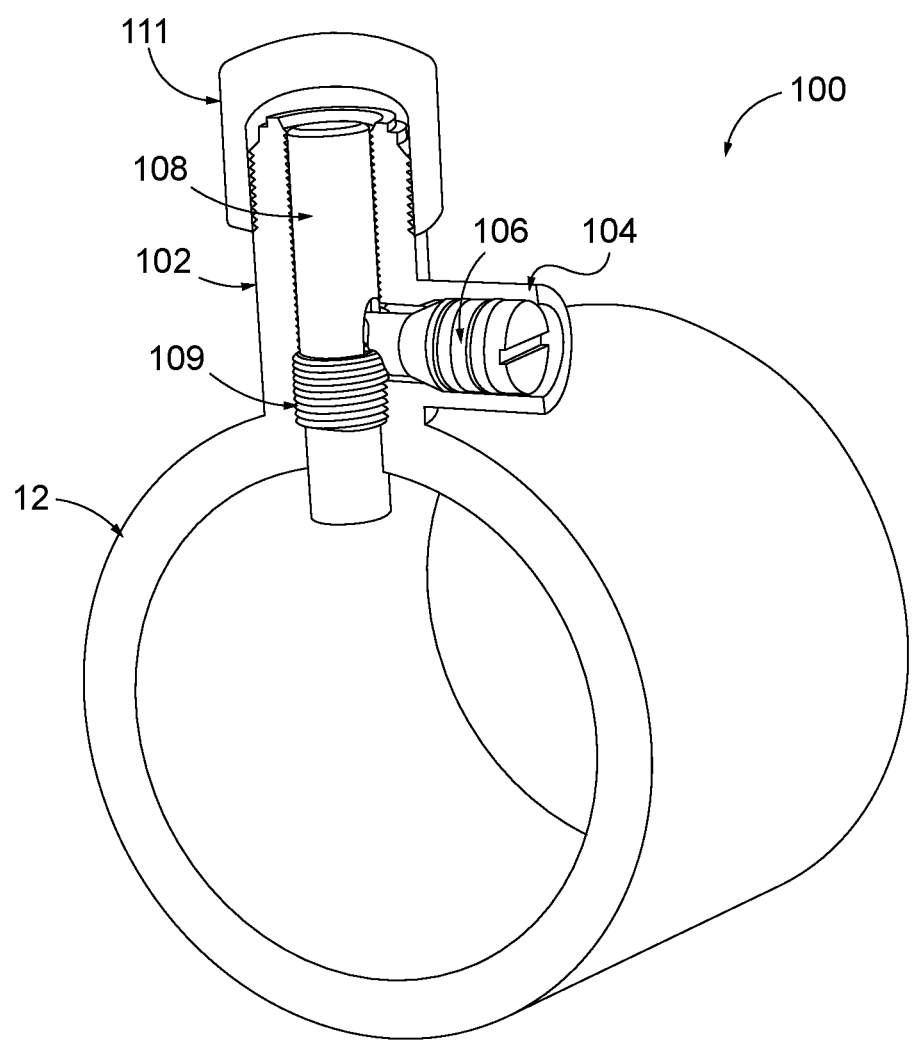
FIG. 5 illustrates a collapsed view of the tee assembly illustrated in FIG. 1, according to an aspect of the disclosure.

FIGS. 4 and 5 illustrate side perspective views of the assembly of the tee assembly 100, according to an aspect of this disclosure. During the operation of abandoning a tee assembly 100, the service to the main 12 may be shut-down. The cutter 109 is then run through the main passage 116 of the chimney 102 until the cutter 109 engages the internal shoulder 124 of the main passage 116. The internal shoulder 124 may be configured to prevent the cutter 109 from further passing through the main passage 116 and into the conduit channel 14. In an alternative aspect, the cutter 109 may be removed from the main passage 116 prior to abandoning the tee assembly 100. The plug 106 is then installed by inserting the plug 106 through the branch passage 132 of the branch portion 104 and at least partially into the main passage 116 of the chimney 102. The plug 106 may be inserted into the branch passage 132 so that the plug shoulder 154 is adjacent to the branch shoulder 131. If the cutter 109 is positioned within the main passage 116, the second cutter end 146 of the cutter 109 is received within the recess 170 of the plug 106.

After the plug 106 has been installed, the retention member 108 may be installed by inserting the retention member 108 into the main passage 116. FIG. 4 illustrates the retention member 108 being inserted into the main passage 116. The retention member 108 is aligned with the plug 106 so that the retention notch 178 is received within the plug notch 172, interlocking the retention member 108 with the plug 106. The plug 106 and retention member 108 may be aligned by rotating the plug 106 and/or by rotating the retention member 108 within their respective passage 116/132. Once the retention member 108 is installed within the passage 116 and interlocked with the plug 106, the plug 106 is substantially prevented from moving out of the branch passage 132.

After the retention member 108 is interlocked with the plug 106, the cap assembly 111 may be installed by securing the cap assembly 111 onto the chimney 102.

The plug 106 may have a diameter that is substantially similar to a diameter of the branch passage 132, and may include o-rings 162 on the upper plug surface 156, to substantially prevent any fluid (e.g., water or gas) from leaking out from the conduit channel 14 through the branch passage 132.

While the disclosure is described herein using a limited number of embodiments, these specific embodiments are for illustrative purposes and are not intended to limit the scope of the disclosure as otherwise described and claimed herein. Modification and variations from the described embodiments exist. The scope of the invention is defined by the appended claims.

What is claimed is:

1. A tee assembly comprising:
a tee member for coupling to a conduit, the tee member defining a main passage and a branch passage, the main passage extending from a main opening of the tee member to an interior of the conduit, and the branch passage extending from a branch opening of the tee member to said main passage;
a plug slideably disposed in said branch passage and at least partially extending into said main passage, said plug having an outer diameter that is substantially similar to an inner diameter of said branch passage such that fluid flow through said branch passage is substantially prevented, said plug defining a plug notch; and
a retention member slideably disposed in said main passage, said retention member defining a retention notch,
wherein said plug is configured to rotate within said branch passage to align said plug notch with said retention notch, said retention notch of said retention member being configured to interlock with said plug notch of said plug within said main passage, and wherein said plug is substantially prevented from moving out of said branch passage when interlocked with said retention member.

2. The tee assembly of claim 1, wherein said plug has an outer plug surface that defines at least one groove, wherein the plug includes at least one o-ring positioned within the at least one groove.

3. The tee assembly of claim 1, wherein the branch passage extends normally outward from the main passage.

4. The tee assembly of claim 1, wherein said plug comprises stainless steel.

5. The tee assembly of claim 1, further comprising:
a cap coupled to said tee member for covering the main opening.

6. The tee assembly of claim 1, further comprising:
a cutter received in said main passage, wherein said cutter has a threaded cutter region, and wherein the threaded cutter region is threadedly engaged with a threaded region of said main passage for selective advancement and retraction within said main passage upon rotation relative to said tee member.

7. An abandonment assembly for a tee member coupled to a conduit, the tee member defining a main passage and a branch passage, the main passage extending from an exterior surface of the tee member to an interior of the conduit, and the branch passage extending from the exterior surface of the tee member to the main passage, the abandonment device comprising:
a plug receivable in the branch passage and at least partially receivable in the main passage, said plug having an outer diameter that is substantially similar to an inner diameter of the branch passage such that fluid flow through the branch passage is substantially prevented said plug defining a plug notch; and
a retention member receivable in the main passage, said retention member defining a retention notch,
wherein said plug is configured to rotate within the branch passage to align said plug notch with said retention notch, said retention notch of said retention member being configured to interlock with said plug notch of said plug within the main passage, and wherein said plug is substantially prevented from moving out of said branch passage when interlocked with said retention member.

8. The abandonment assembly of claim 7, wherein said plug has an outer plug surface that defines at least one groove, wherein said plug includes at least one o-ring positioned within the at least one groove.

9. The abandonment assembly of claim 7, wherein said plug has a first portion that at least partially extends into the main passage, wherein the first portion defines a plug notch, and wherein said retention member defines a retention notch, wherein said plug notch is received within said retention notch to interlock said plug within the main passage.

10. The abandonment assembly of claim 9, further comprising a cutter received in said main passage, wherein the first portion further defines a recess for receiving the cutter within.

11. An abandonment assembly for a tee member coupled to a conduit, the tee member defining a main passage and a branch passage, the main passage extending from an exterior surface of the tee member to an interior of the conduit, and the branch passage extending from the exterior surface of the tee member to the main passage, the abandonment device comprising:
a plug receivable in the branch passage and at least partially receivable in the main passage, said plug having an outer diameter that is substantially similar to an inner diameter of the branch passage such that fluid flow through the branch passage is substantially prevented; and
a retention member receivable in the main passage, said retention member configured to interlock with said plug within the main passage, wherein said plug is substantially prevented from moving out of said branch passage when interlocked with said retention member,
wherein said plug has a first portion that at least partially extends into the main passage, wherein the first portion defines a plug notch, and wherein said retention member defines a retention notch, wherein said plug notch is received within said retention notch to interlock said plug within the main passage,
wherein said plug has a second portion adjacent to the first portion, and wherein the second portion includes a conical shape.

12. The abandonment assembly of claim 11, wherein said plug has a third portion adjacent to the second portion, and wherein the third portion has a diameter that is greater than a diameter of the first portion.

13. The abandonment assembly of claim 12, wherein the third portion defines a tool receiving element.

14. A method for abandoning a tee assembly, the tee assembly including a tee member that defines a main passage and a branch passage, the main passage extends into a conduit, and the branch passage extends into the main passage, the method comprising:
- running a cutter through the main passage and into the conduit;
- installing a plug through the branch passage and into the main passage, the plug defining a plug notch;
- after running the cutter through the main passage and installing the plug, installing a retention member into the main passage, the retention member defining a retention notch; and
- interlocking the retention notch of the retention member with the plug notch of the plug by rotating the plug within the branch passage,
- wherein the plug is prevented from moving within said branch passage when interlocked with the retention member.

15. The method of claim 14, wherein the branch passage is defined by a branch member, the method further comprising:
- cutting the branch member to a desired length.

16. The method of claim 14, wherein the main passage is defined by a chimney member, the method further comprising:
- after installing the retention member, installing a cap onto the chimney member.

* * * * *